Figure 1:
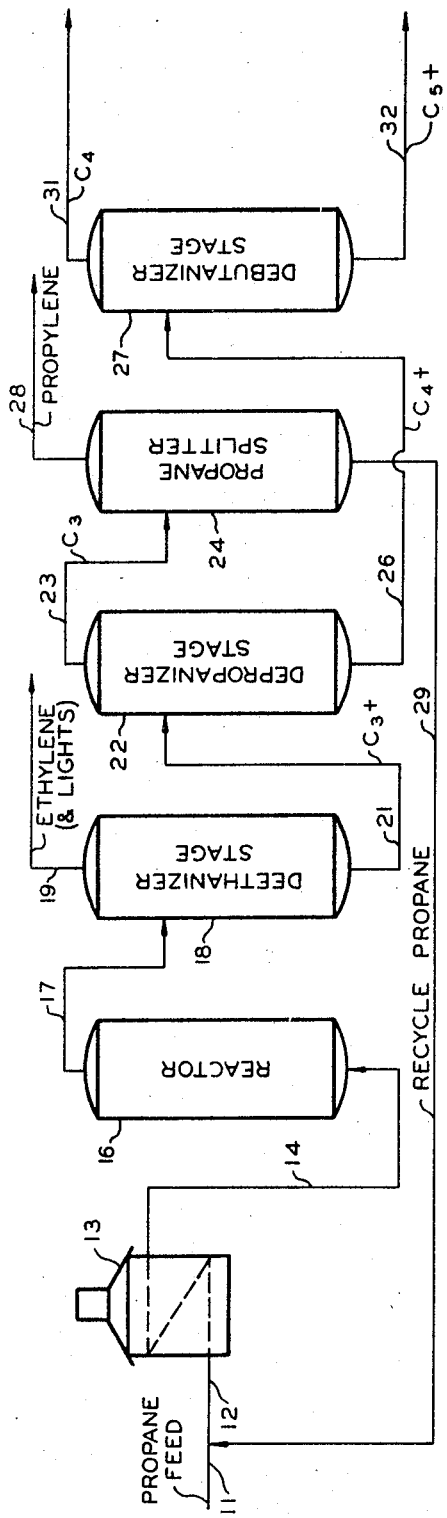

INVENTORS
L. F. HECKELSBERG
R. L. BANKS
BY Young & Quigg
ATTORNEYS

United States Patent Office 3,445,541
Patented May 20, 1969

3,445,541
COMBINED DEHYDROGENATION AND
DISPROPORTIONATION
Louis F. Heckelsberg and Robert L. Banks, Bartlesville, Okla., assignors to Phillips Petroleum Company, a corporation of Delaware
Filed Jan. 4, 1965, Ser. No. 423,206
Int. Cl. C07c 5/18
U.S. Cl. 260—683                                6 Claims This invention relates to combined disproportionation and dehydrogenation. In one aspect it relates to the disproportionation of an olefin and the dehydrogenation of a resulting product. In another aspect it relates to the dehydrogenation of hydrocarbons and the disproportionation of the dehydrogenated product. In another aspect it relates to the conversion of a paraffin hydrocarbon into a plurality of olefinic hydrocarbons. In another aspect it relates to a combined dehydrogenation-disproportionation catalyst. In another aspect it relates to apparatus for hydrocarbon dehydrogenation and disproportionation.

We have found that two operations, namely the dehydrogenation of hydrocarbons and disproportionation of olefins, can, unexpectedly, be accomplished in a single, more convenient operation. The advantages of such a unitized process include a reduction in the number of separate heat exchangers, heaters, regulators, controls and similar equipment. The operation of activation or regeneration of the dehydrogenation catalyst and the disproportionation catalyst are carried out simultaneously, thus simplifying the total process.

An object of the invention is to provide a combined dehydrogenation and disproportionation process.

Another object of the invention is to dehydrogenate a hydrocarbon to produce an olefin and to disproportionate the resulting olefins.

Another object of the invention is to disproportionate an olefin and dehydrogenate a resulting product.

Another object of the invention is to provide a dual purpose, dehydrogenation-disproportionation catalyst.

Another object of the invention is to provide apparatus for combined dehydrogenation and disproportionation.

We have found that disproportionation and dehydrogenation can be combined. Suitable reactants include acyclic paraffins and olefins having from 3 to 6 carbon atoms per molecule, especially propylene and propane. Especially valuable processes according to the invention include the disproportionation of propylene and the dehydrogenation of the resulting butene to produce butadiene, and the dehydrogenation of propane and the disproportionation of the resulting propylene. A feature of our invention is using a combined dehydrogenation-disproportionation catalyst in a single bed reactor.

Some examples of suitable catalysts for dehydrogenation include alumina catalysts which are promoted by oxides or other compounds of platinum, iron, potassium, sodium, chromium, molybdenum, tungsten, uranium, beryllium, magnesium, copper, calcium and thorium, or combinations thereof. Chromium oxide supported on alumina and also containing sodium oxide is a preferred dehydrogenation catalyst. The suitable catalysts include those disclosed in U.S. 2,902,522, Owen, "Dehydrogenation Process and Catalyst"; U.S. 2,576,034, Myers (1951); 2,428,151, Frey (1947); 2,638,455, Pitzer (1953); 2,739,996, Pitzer (1956); and others.

The disproportionation catalysts applicable to this invention can be any which are active at temperatures of about 800° F. or higher. Suitable catalysts are disclosed and claimed in copending application Ser. No. 307,371, Heckelsberg, filed Sept. 9, 1963, and now abandoned.

The catalysts can be prepared in any suitable form, depending upon the type of reaction system in which they are to be used. For example, they can be prepared in the form of pellets, beads, extrudates, or they can be finely divided to provide catalysts suitable for fluidization. The proportionation of disproportionation catalyst and dehydrogenation catalyst in the process depends upon the catalyst chosen and their relative activities. The optimum quantity of each catalyst component can readily be ascertained by one skilled in the art. Preferably the component blend has the following compositional ranges in volume percent:

| Component | Broad | Preferred |
|---|---|---|
| Disproportionation Catalyst | 2–90 | 5–50 |
| Dehydrogenation Catalyst | 10–98 | 50–95 |

The disproportionation promoter is selected from the group consisting of tungsten oxide and molybdenum oxide and the support comprises silica. The promoter is present in the range of 0.1 to 30 percent by weight of the catalyst, preferably 3–12 percent. Excellent results have been obtained with catalysts containing about 9 weight percent. The base can be a relatively pure silica or can be one containing alumina. Bases having from 0–30 weight percent alumina gave good results. Excellent results have been obtained with bases having 10–15 weight percent alumina. Other materials which do not change the essential characteristics of the disproportionation reaction can be present. Preferably, the dehydrogenation promoter is selected from the group consisting of oxides or other compounds of a metal selected from a group consisting of iron, potassium, chromium, molybdenum, tungsten, uranium, vanadium, beryllium, magnesium, copper, calcium and thorium. Each of the catalyst components must be activated. The activation can be carried out by heating at a temperature up to 1600° F. for periods of 0.1 to 25 hours either before or after the two components have been blended.

According to the invention, the combined dehydrogenation-disproportionation catalyst comprises a non-stratified, random distribution of the two solid catalyst components.

In the practice of our invention, conditions are selected so that appreciable amounts of both reactions are obtained. The process can be carried out at temperatures from about 800–1200° F. at pressures of 0 to 1500 p.s.i.g. The process can be carried out either batch wise or continuously, using a fixed catalyst bed, or a stirrer-equipped reactor or other mobile catalyst contacting processes as well as any other well known contacting techniques. Preferred reaction conditions, e.g., temperature, pressure, flow rates, etc., vary somewhat depending upon the specific catalyst composition, the particular feed, desired products, etc.

At the end of the reaction period, the hydrocarbon phase is separated from the solid catalyst by known methods and subjected to product recovery. Such techniques as fractionation, solvent extraction, and the like, can be employed for separation of products. Unconverted feed materials or products not in the desired range can be recycled. The contact time generally is in the range of about 0.1 to about 100 seconds and the gaseous hourly space velocities from about 6 to about 5000 are generally used.

Figure 2:
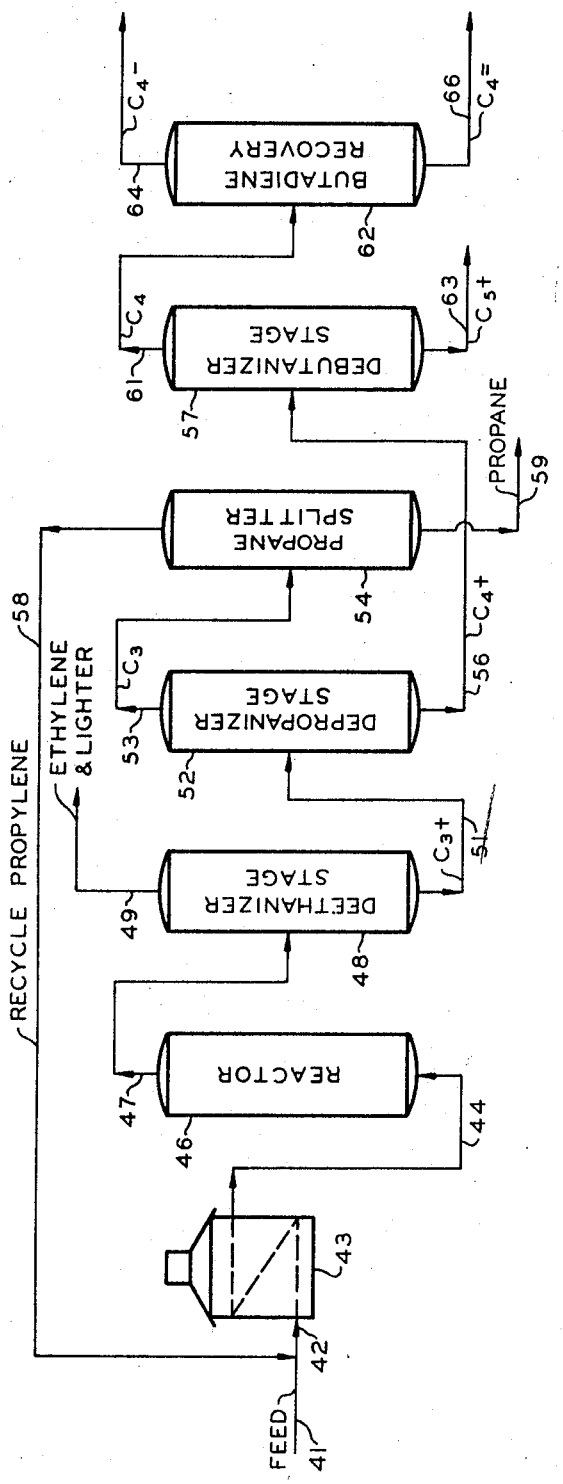

FIGURE 1 is a schematic representation of an apparatus according to our invention utilizing a dual function catalyst bed and adapted to process a propane containing feed. FIGURE 2 is a schematic representation of an apparatus according to our invention utilizing a dual function catalyst bed and adapted to process a propylene containing feed.

In the invention as illustrated in FIGURE 1, a feed comprising propane is fed through pipe 11 and pipe 12, through preheater 13 and pipe 14 into reactor 16 comprising a composite catalyst which promotes both dehydrogenation and disproportionation. The effluent from reactor 16 passes through pipe 17 into deethanizer 18 which can be a fractional distillation column. The overhead from deethanizer 18, comprising ethylene and lighter components, is removed through pipe 19, while the remainder of the stream is passed through pipe 21 to depropanizer 22. The overhead from depropanizer 22, comprising propane and propylene, is passed through pipe 23 into propane splitter 24. The heavier products are passed through pipe 26 to debutanizer 27. From propane splitter 24 propylene is taken overhead through pipe 28 while propane is recycled through pipe 29. The overhead from debutanizer 27, comprising butene, is removed through pipe 31, while $C_5$ and heavier hydrocarbons are removed through pipe 32.

In the invention as illustrated in FIGURE 2, a feed comprising propylene is fed through pipe 41 and pipe 42, through preheater 43 and pipe 44, into reactor 46, comprising a composite catalyst which promotes both dehydrogenation and disproportionation. The effluent from reactor 46 passes through pipe 47 into deethanizer 48 which can be a fractional distillation column. The overhead from deethanizer 48, comprising ethylene and lighter components, is removed through pipe 49, while the remainder of the stream is passed through pipe 51 to depropanizer 52. The overhead from depropanizer 52, comprising propane and propylene, is passed through pipe 53 into propane splitter 54. The heavier products are passed through pipe 56, into debutanizer 57. From propane splitter 54 propylene is recycled through pipe 58, while propane is taken through pipe 59. The overhead from debutanizer 57, comprising butenes and butadiene, is passed through pipe 61 to butadiene recovery unit 62, while $C_5$ and heavier hydrocarbons are removed through pipe 63. Butenes and butadiene are separated in unit 62, with butenes being removed through pipe 64 and butadiene through pipe 66.

Example I

In this example, propane was passed through a mixed catalyst bed which contained both a dehydrogenation catalyst and a disproportionation catalyst. The dehydrogenation catalyst was a chromium oxide impregnated alumina. The catalyst contained 80.5 weight percent alumina, 19.1 weight percent chromic oxide, and 0.4 weight percent sodium oxide. The disproportionation catalyst was a conventional silica supported tungsten oxide which was made by impregnating silica with an aqueous solution of ammonium tungstate. The finished catalyst contained about 3 weight percent tungsten oxide. Each of the catalysts was in the form of 20–40 mesh granules. The chromium catalyst was activated by treating the hydrogen at 1000° F. for 30 minutes. The tungsten catalyst was activated by treating in air at 1000° F. for 30 minutes. Equal volumetric quantities of each of these two activated catalysts were then blended and charged into a stainless steel reactor. A stainless steel coil was connected ahead of the bed as a preheat zone. Thermocouples were located in the upper, middle and lower portions of the catalyst bed to measure the temperature in those areas. Pure grade propane was then admitted into the reactor maintained at an average temperature of 1060° F., a pressure of 205 p.s.i.g., and at a gaseous hourly space velocity of about 1250 vol. feed/vol. catalyst/hr. based on the total catalytic bed (or 2500 v./v./hr. based on each individual catalyst). The effluent from the reactor was periodically analyzed by vapor phase chromatography. The reaction was allowed to continue for about two hours and forty minutes. During the last thirty minutes of this run, the reactor effluent had an analysis, in weight percent, as shown in the table below. The analysis is on a propane free basis. At the time this sample was taken, the reactor bed had temperatures of 1060, 1070, and 1050° F. for the top, middle and lower portions, respectively.

| | |
|---|---|
| Hydrogen | 2.5 |
| Methane | 6.1 |
| Ethane | 33.3 |
| Ethylene | 3.3 |
| Propylene | 27.1 |
| Isobutane | 0.9 |
| n-Butane | 12.2 |
| 1-butene | 4.1 |
| Trans-2-butene | 3.2 |
| Cis-2-butene | 2.5 |
| $C_5+$ | 4.8 |
| | 100.0 |

The nature of the products seen in the above table indicate that simultaneous dehydrogenation and disproportionation were accomplished. Propane was dehydrogenated to propylene, and a substantial quantity of the propylene was disproportionated to ethylene and butenes. The conversion of propane was about 21.6 percent.

As a control run, Run 2, the above propane conversion process was repeated under essentially identical conditions except that the catalyst bed contained a mixture of the chromium dehydrogenation catalyst and alpha alumina granules which were used to dilute the catalyst and maintain the same total bed size. At a pressure of 205 p.s.i.g. and at a gaseous hourly space velocity of 2500 v./v./hr. based on the chromium catalyst alone and at a temperature of 1060, 1070 and 1050° F. for the top, middle and lower portions of the bed, respectively, the effluent analysis showed a propane conversion of about 13.9 percent. The product consisted of 53.0 weight percent propylene and 47.0 percent $C_2$ product and lighter, with only a trace of $C_4$ products. This run demonstrates that, without the disproportionation promoter, essentially no disproportionation was obtained.

Another control run using just a quantity of the chromium catalyst in the bed gave essentially the same results as the above described control run.

Example II

Propane was dehydrogenated-disproportionated at atmospheric pressure using mixtures of catalysts containing, as a disproportionation catalyst, a silica gel containing about 9 weight percent tungsten oxide. The dehydrogenation catalyst was the chromium oxide promoted alumina composite described in Example I. The conversion was carried out in a stainless steel pipe reactor which was heated in an electrical furnace. Each catalyst was in the form of 20–40 mesh size particles. Except where noted, the catalyst bed consisted of a homogeneous blend mixture of the dehydrogenation and the disproportionation catalysts. The silica-tungsten oxide catalyst was activated in air at 1000° F., mixed with the dehydrogenation catalyst, and the blend was then heat treated within the reactor at 1100° F. in a stream of flowing air. In some runs, the two catalysts were ball milled together to a fine powder, pressed into pellets, and then crushed to a 20–40 mesh size before use in the conversion system.

The conditions of the runs and the analysis of the runs are seen in the following table:

|  | Run | | | |
|---|---|---|---|---|
|  | 3 | 4 | 5 | 6 |
| Catalysts, parts by volume: | | | | |
| Dehydrogenation | 55 | 55 | 28 | 21 [1] |
| Disproportionation | 0 | 5 | 28 | 21 |
| Conditions: | | | | | | |
| Temp., °F | 1,055 | 1,075 | 1,060 | 1,060 | 1,040 | 1,045 |
| V./v./hr | 110 | 110 | 100 | 110 | 100 | 50 |
| Time, minutes [2] | 60 | 94 | 60 | 135 | 45 | 78 |
| Propane, Conversion, percent | 19.3 | 19.4 | 34.6 | 15.0 | 26.9 | 29.6 |
| Product Distribution, wt. percent: | | | | | | |
| $H_2$ and Methane | 10 | 10 | 13 | 4 | 10 | 11 |
| Ethylene and Ethane | 8 | 12 | 33 | 13 | 21 | 30 |
| Propylene | 82 | 78 | 30 | 67 | 52 | 27 |
| Butenes and Butanes | | | 20 | 16 | 16 | 22 |
| $C_5+$ | | | 4 | | 1 | |

[1] Catalyst mixture "ball-milled" and formed into pellets then crushed to a 20–40 mesh size.
[2] Time on stream when spot sample was obtained.

The data in the table above show that the addition of a disproportionation catalyst to a dehydrogenation catalyst in a single mixed bed produces the beneficial effects of both catalysts. The data also show that the catalyst system activity is increased when the mixture is made more intimate by ball milling the two catalysts together. Ball milling also appeared to increase the ethane content of the products.

Example III

In this series of runs, propane was dehydrogenated-disproportionated in a manner similar to that of Example II except that the disproportionation catalyst was a silica-alumina which contained about 9 weight percent tungsten oxide. The silica-alumina portion of the catalyst contained about 90 weight percent silica. The tests were carried out at atmospheric pressure.

The conditions and results of these tests are shown in the following table:

|  | Run | | |
|---|---|---|---|
|  | 7 | 8 | 0 |
| Catalyst, parts by volume: | | | |
| Dehydrogenation | 40 | 50 | 50 [1] |
| Disproportionation [2] | 20 | 10 | 10 |
| Conditions: | | | | | | | |
| Temp., °F | 1,050 | 1,040 | 1,055 | 1,050 | 1,040 | 1,040 | 1,040 |
| V./v./hr | 100 | 100 | 100 | 100 | 100 | 200 | 300 |
| Time, minutes | 30 | 150 | 95 | 247 | 112 | 153 | 191 |
| Propane Conversion, wt. percent | 44.0 | 39.7 | 45.3 | 33.9 | 45.2 | 34.7 | 32.6 |
| Product Distribution, wt. percent: | | | | | | | |
| $H_2$ and Methane | 10 | 5 | 7 | 5 | 8 | 6 | 3 |
| Ethylene-Ethane | 32 | 27 | 26 | 21 | 25 | 15 | 11 |
| Propylene | 33 | 32 | 37 | 43 | 39 | 57 | 63 |
| Butenes and Butanes | 17 | 17 | 18 | 17 | 17 | 16 | 13 |
| $C_5+$ | 8 | 19 | 12 | 14 | 1 | 6 | 10 |

[1] Catalyst from Run 8 after regeneration with air at 1,100° F. for two hours.
[2] At 1,000 to 1,050 $WO_3$-$SiO_2$-$Al_2O_3$ showed very little activity for converting propane. At 1,100° F. and 600 v./v./hr. about 2 percent conversion was obtained.

The data in the table above show that the silica-alumina supported disproportionation catalyst results in high propane conversion and also in an increase in the amount of $C_5+$ material. The data also show that the catalyst system is capable of regaining activity after suitable regeneration.

Example IV

Using catalysts identical to those of Example III, runs were carried out to show the effect of time on stream and the effect of catalyst regeneration. The conversion was carried out in a stainless steel pipe reactor using a catalyst bed containing 50 parts by volume of the dehydrogenation catalyst and 10 parts by volume of the disproportionation catalyst. The conversion was carried out at atmospheric pressure.

The data in the table below show the conditions and results of these runs.

| Run | 10 | 11 | 12 | 13 | 14 |
|---|---|---|---|---|---|
| Catalyst | Fresh | Fresh | Reg. | Reg. | Reg. |
| Temperature, °F | 1,050 | 1,125 | 1,125 | 1,125 | 1,125 |
| Space Velocity, v./v./hr | 100 | 1,000 | 1,000 | 500 | 1,000 |
| Percent Propane Conversion After— | | | | | |
| 1 Hour | 52 | 29 | 22 | 35 | 26 |
| 2 Hours | 49 | 15 | 14 | 22 | 17 |
| 3 Hours | 45 | 11 | 15 | 15 | 13 |
| 4 Hours | 41 | 9 | | 14 | |

The data in the table above show that the activity of the catalyst system is only gradually reduced with time on stream and that the regenerated catalyst behaves in an essentially identical fashion to that of a fresh catalyst. The last four runs were carried out with the same catalyst system and included three regenerations. The regeneration was accomplished by heating the catalyst of Run 11 to 1100° F. in flowing air. The regenerated catalyst was used in Run 12 and then similarly regenerated for use in Runs 13 and 14.

Example V

In this series of runs, propane was similarly dehydrogenated-disproportionated as in the preceding examples except that the chromium oxide promoted alumina dehydrogenation catalyst was replaced with platinum-containing dehydrogenation catalysts. One platinum catalyst was a silica gel promoted with 0.5 weight percent platinum. It was activated in air at 1000° F. for 35 minutes followed by 10 minutes in hydrogen. Another catalyst was an alumina promoted with 0.3 weight percent platinum, 0.3 weight percent fluorine, and 0.5 weight percent chlorine, the remainder being alumina. This catalyst was activated 1 hour at 1100° F. in air followed by 30 minutes in hydrogen.

The table below shows the essential data for the runs.

| Run | 15 | 16 | 17 |
|---|---|---|---|
| Catalyst, parts by volume: | | | |
| Pt-SiO$_2$ | 10 | | |
| Pt-F-Cl-Al$_2$O$_3$ | | 50 | 50 |
| WO$_3$-SiO$_2$ | | 10 | 10 |
| Pt-WO$_3$-SiO$_2$-Al$_2$O$_3$ | 10 | | |
| Temperature, °F | 1,060 | 1,045 | 980 |
| Pressure, p.s.i.g. | 0 | 0 | 150 |
| Space Velocity, v./v./hr | 900 | 300 | 1,000 |
| Propane Conversion, percent | 1.7 | 17.6 | 16.5 |

The data in the table above show that the invention process is also operable with platinum-containing dehydrogenation catalysts.

Example VI

In this example, propane was dehydrogenated-disproportionated using a mixed catalyst bed reactor with varying quantities of each type catalyst including a run in which the mixed catalyst bed contained a preponderance of the disproportionation catalyst. The dehydrogenation catalyst was the chromium oxide promoted alumina described in Example I. It was activated in a stream of flowing air at 1000° F. followed by a hydrogen treatment at the same temperature. The disproportionation catalyst was a silica gel promoted with about 8 weight percent tungsten oxide and which was activated in a stream of flowing air at 1000° F. for 1 hour. Each catalyst was flushed with nitrogen, mixed thoroughly, and charged into the reactor. The conversion was carried out at 205 p.s.i.g.

The conditions and results of the tests are shown in the table below.

The table below shows the essential data from the run, Run 21.

| | |
|---|---|
| Dehydrogenation, parts by vol. | 50 |
| Disproportionation, parts by vol. | 10 |
| Temperature, °F. | 1050 |
| Pressure, p.s.i.g. | 0 |
| Space rate, v./v./hr. | 500 |
| Conversion, percent | 29.3 |
| Product distribution, wt. percent: | |
| Methane and hydrogen | 4 |
| Ethylene and ethane | 7 |
| Propylene | 84 |
| C$_4$ (olefin and paraffins) | 3 |
| C$_5$+ | 2 |

It is seen from the data in the table above that a molybdenum oxide-containing disproportionation catalyst is also operable in the invention catalytic process.

Example VIII

A catalytic fixed bed reactor was prepared from a section of stainless steel pipe. The reactor was charged with an intimate mixture of 55 parts by volume of a dehydrogenation catalyst (19.1 weight percent Cr$_2$O$_3$, 0.4 weight percent Na$_2$O, and 80.5 weight percent Al$_2$O$_3$) and 5 parts by volume of a disproportionation catalyst (9.0 weight percent WO$_3$, 91.0 weight percent SiO$_2$). The size of the catalyst particles within the bed were 20–40 mesh. Before use in the hydrocarbon conversion process, the catalyst bed was activated by treatment with flowing dry air for 1 hour while the reactor and bed were maintained at 1100° F.

In Run 22, the temperature of the fixed bed reaction

| | Run | | | | | | |
|---|---|---|---|---|---|---|---|
| | 18 | | 19 | | 20 | | |
| Dehydrogenation Catalyst, parts by volume | 2 | | 4 | | 6 | | |
| Disproportionation Catalyst, parts by volume | 8 | | 4 | | 2 | | |
| Temperature, °F | 1,068 | 1,070 | 1,050 | 1,070 | 1,074 | 1,060 | 1,070 |
| Space Velocity, v./v./hr | 1,000 | 1,000 | 1,350 | 1,300 | 1,350 | 1,050 | 1,050 |
| Effluent, percent wt.: | | | | | | | |
| Methane, Hydrogen | 1.9 | 2.3 | 1.2 | 5.0 | 2.9 | 4.5 | 4.8 |
| Ethylene, Ethane | 1.2 | 2.9 | 4.0 | 9.2 | 2.7 | 11.5 | 1.7 |
| Propane | 91.6 | 87.4 | 83.2 | 75.3 | 88.5 | 74.9 | 87.7 |
| Propylene | 3.8 | 4.2 | 4.4 | 3.7 | 2.9 | 3.6 | 4.3 |
| Isobutane | 0.6 | 0.5 | 0.8 | 0.6 | 0.5 | 0.5 | 0.5 |
| n-Butane | 0.3 | 0.7 | 2.1 | 1.8 | 0.2 | 2.9 | 0.3 |
| 1-butene | 0.3 | 0.6 | 0.6 | 1.2 | 0.7 | 0.6 | 0.2 |
| t-2-butene | 0.3 | 0.6 | 0.4 | 0.8 | 0.5 | 0.5 | 0.1 |
| Cis-2-butene | 0.2 | 0.4 | 0.4 | 0.6 | 0.3 | 0.4 | 0.1 |
| C$_5$+ and Butadiene | | 0.4 | 3.0 | 1.8 | 0.8 | 0.7 | 0.3 |
| Conversion, percent | 9.4 | 12.6 | 16.8 | 24.7 | 11.5 | 25.3 | 12.3 |
| Time on Stream, hour | 1 | 2.5 | (1) | 1.5 | 3 | .75 | 1.5 |

[1] 8 min.

The data in this Example VI demonstrate the invention process is operative over a broad range of proportion of the disproportionation and dehydrogenation catalyst components.

Example VII

In this example, propane was dehydrogenated-disproportionated by passage through a mixed catalyst bed containing the chromium-oxide promoted alumina dehydrogenation catalyst described in Example I and a disproportionation catalyst consisting of a 90–10 silica-alumina support promoted with about 8 weight percent molybdenum oxide. The propane conversion was carried out in a stainless steel pipe reactor under the same general conditions utilized in the preceding examples.

was adjusted to 900° F. A stream of propylene was passed through the catalytic converter at a rate of 1000 vol. feed/vol. catalyst/hour and at essentially atmospheric pressure. Analysis of the effluent showed that the propylene conversion was 18.5 percent and that butadiene was produced in an amount corresponding to 3.8 percent of the converted propylene.

In Run 23, while other conditions of the test remained constant, the temperature was increased to 1015° F. Analysis of the effluent under these conditions showed propylene conversion at 34 percent and the butadiene yield at 4.5 percent.

The temperature of the reactor was again increased and after operation for one hour at 1085° F. and at a propylene flow rate of 1000 vol. feed/vol. catalyst/hour, the effluent was again analyzed. The propylene feed rate was then reduced to 200 vol. feed/vol. catalyst/hour and the temperature increased to 1100° F. The effluent was again examined. The results of these latter two runs are shown in the following table in terms of the components of the reactor effluent, in weight percent.

|  | Run 24 | Run 25 |
|---|---|---|
| Hydrogen | 0.8 | 0.8 |
| Methane | 0.5 | 1.9 |
| Ethane | 0.7 | 2.9 |
| Ethylene | 14.7 | 16.6 |
| Propane | 1.4 | 5.3 |
| Propylene | 50.7 | 40.4 |
| Isobutane | 0.1 | 0.1 |
| n-Butane | 0.1 | 0.8 |
| Isobutene+1-butene | 5.6 | 5.2 |
| Trans-2-butene | 7.7 | 7.1 |
| Cis-2-butene | 5.8 | 5.3 |
| 1,3-butadiene | 2.9 | 1.9 |
| $C_5+$ | 9.1 | 11.7 |
| Propylene Conversion | 49.3 | 59.6 |
| Percent of Converted Propylene to Butadiene | 5.9 | 3.2 |

The data in the above table and paragraphs show that under the conditions used, there was a high conversion of propylene, and that butadiene was obtained in yields of about 5 to 6 percent of the converted propylene. In addition, a good yield of $C_5+$ material was obtained.

Reasonable variation and modification are possible within the scope of our invention which sets forth method and catalysts for disproportionation and dehydrogenation.

We claim:

1. A hydrocarbon conversion process which comprises: passing a hydrocarbon feed comprising a reactant selected from the group consisting of acyclic paraffins and acyclic olefins having 3–6 carbon atoms per molecule into a zone containing a combined dehydrogenation-disproportionation catalyst comprising a mixture of between 10 and 98 volume percent of a dehydrogenation catalyst active for hydrocarbon dehydrogenation and formed of alumina promoted with a material selected from the group consisting of platinum, iron, potassium, sodium, chromium, uranium, vanadium, beryllium, magnesium, copper, calcium, and thorium and compounds thereof and between 2 and 90 volume percent of a disproportionation catalyst active for olefin disproportionation and formed of a base selected from the group consisting of silica and silica-alumina promoted with a compound selected from the group consisting of tungsten oxide and molybdenum oxide, said dehydrogenation component being effective to promote dehydrogenation under conditions for which said disproportionation component is effective to promote disproportionation; and
maintaining conditions, including conditions of temperature and pressure, in said zone to promote dehydrogenation and disproportionation.

2. A hydrocarbon conversion process which comprises passing a hydrocarbon feed comprising a reactant selected from the group consisting of acyclic paraffins and olefins having 3–6 carbon atoms per molecule into a reaction zone containing a combined dehydrogenation-disproportionation catalyst comprising a mixture of 50 to 95 volume percent dehydrogenation catalyst and 5 to 50 volume percent of a disproportionation catalyst, said dehydrogenation catalyst comprising alumina promoted by a material selected from the group consisting of platinum, iron, potassium, sodium, chromium, uranium, vanadium, beryllium, magnesium, copper, calcium, and thorium and compounds thereof and said disproportionation catalyst comprising a compound selected from the group consisting of tungsten oxide and molybdenum oxide supported on a base selected from the group consisting of silica and silica-alumina under conditions to promote dehydrogenation and disproportionation, including a temperature in the range of 800–1200° F. and a pressure in the range of 0–1500 p.s.i.g.

3. A hydrocarbon conversion process which comprises passing a hydrocarbon feed comprising a reactant selected from the group consisting of propane and propylene into a zone containing a combined dehydrogenation-disproportionation catalyst comprising a mixture of 50 to 95 volume percent of a dehydrogenation catalyst and 5 to 50 volume percent of a disproportionation catalyst, said dehydrogenation catalyst comprising a material selected from the group consisting of chromium oxide and platinum supported on alumina and said disproportionation catalyst comprising a compound selected from the group consisting of tungsten oxide and molybdenum oxide supported on a base selected from the group consisting of silica and silica-alumina under conditions to promote disproportionation and dehydrogenation including a temperature in the range of 800–1200° F. and a pressure in the range of 0–1500 p.s.i.g.

4. A hydrocarbon conversion process which comprises passing a hydrocarbon feed comprising propane into a zone containing a combined dehydrogenation-disproportionation catalyst comprising a mixture of 50 to 95 volume percent of a dehydrogenation catalyst and 5 to 50 volume percent of a disproportionation catalyst, said dehydrogenation catalyst comprising a catalyst selected from a group consisting of chromium oxide supported on alumina and also containing sodium oxide and platinum supported on alumina and said disproportionation catalyst comprising a compound selected from the group consisting of tungsten oxide and molybdenum oxide supported on a base selected from the group consisting of silica and silica-alumina under conditions including a temperature in the range of 800–1200° F. and a pressure in the range of 0–1500 p.s.i.g. to produce propylene and to disproportionate propylene to ethylene and butenes.

5. A hydrocarbon conversion process which comprises passing a hydrocarbon feed comprising propylene into a zone containing a combined dehydrogenation-disproportionation catalyst comprising a mixture of 50 to 95 volume percent of a dehydrogenation catalyst and 5 to 50 volume percent of a disproportionation catalyst, said dehydrogenation catalyst comprising a catalyst selected from a group consisting of chromium oxide supported on alumina and also containing sodium oxide and platinum supported on alumina and said disproportionation catalyst comprising a compound selected from the group consisting of tungsten oxide and molybdenum oxide supported on a base selected from the group consisting of silica and silica-alumina under conditions including a temperature in the range of 800–1200° F. and a pressure in the range of 0–1500 p.s.i.g. to disproportionate propylene and to produce butadiene.

6. A hydrocarbon conversion process which comprises: passing a hydrocarbon feed comprising a reactant selected from the group consisting of acyclic paraffins and acyclic olefins having 3 to 6 carbon atoms per molecule into a zone containing a combined dehydrogenation-disproportionation catalyst comprising a mixture of 50 to 95 volume percent of a dehydrogenation catalyst and 5 to 50 volume percent of a disproportionation catalyst, said dehydrogenation catalyst comprising a material selected from the group consisting of chromium oxide and platinum supported on alumina and said disproportionation catalyst comprising a compound selected from the group consisting of tungsten oxide and molybdenum oxide supported on a base selected from the group consisting of silica and silica-alumina under conditions to promote disproportionation and dehydrogenation including a temperature in the range of 800 to 1200° F. and a pressure in the range of 0 to 1500 p.s.i.g.

References Cited

UNITED STATES PATENTS

| 2,178,584 | 11/1939 | Grosse | 260—680 |
| 2,389,406 | 11/1945 | Bloch et al. | 260—683.3 |

(Other references on following page)